(12) United States Patent
Sinner-Hettenbach et al.

(10) Patent No.: US 8,732,963 B2
(45) Date of Patent: May 27, 2014

(54) ELECTRIC HAND POWER TOOL

(75) Inventors: Martin Sinner-Hettenbach, Rutesheim (DE); Tobias Lutz, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 372 days.

(21) Appl. No.: 12/737,914

(22) PCT Filed: Jul. 7, 2009

(86) PCT No.: PCT/EP2009/058542
§ 371 (c)(1),
(2), (4) Date: Feb. 28, 2011

(87) PCT Pub. No.: WO2010/023007
PCT Pub. Date: Mar. 4, 2010

(65) Prior Publication Data
US 2011/0146087 A1    Jun. 23, 2011

(30) Foreign Application Priority Data
Aug. 29, 2008   (DE) .......................... 10 2008 041 682

(51) Int. Cl.
*B27B 19/04*   (2006.01)
(52) U.S. Cl.
USPC ............................................ 30/392; 30/394
(58) Field of Classification Search
USPC .................................................. 30/392–394
See application file for complete search history.

(56) References Cited

U.S. PATENT DOCUMENTS

| | | | |
|---|---|---|---|
| 1,554,096 A * | 9/1925 | Jensen | 30/394 |
| 3,204,470 A | 9/1965 | Bruckner | |
| 3,206,989 A | 9/1965 | Enders | |
| 3,388,728 A | 6/1968 | Riley, Jr. et al. | |
| 4,240,204 A | 12/1980 | Walton, II et al. | |
| 4,255,858 A * | 3/1981 | Getts | 30/393 |
| 4,512,078 A | 4/1985 | Pfanzer | |
| 4,628,605 A | 12/1986 | Clowers | |
| 5,103,565 A * | 4/1992 | Holzer, Jr. | 30/392 |
| 5,188,188 A * | 2/1993 | Mars | 30/392 |
| 5,511,912 A * | 4/1996 | Ellerbrock | 30/392 |
| 6,725,548 B1 * | 4/2004 | Kramer et al. | 30/392 |
| 6,729,412 B2 * | 5/2004 | Shinohara | 30/392 |
| 6,820,339 B2 * | 11/2004 | Albrightson | 30/392 |
| 6,868,918 B2 * | 3/2005 | Shinohara | 30/392 |
| 6,911,764 B2 * | 6/2005 | Pelrine et al. | 310/328 |
| 7,430,807 B2 * | 10/2008 | Saegesser et al. | 30/392 |
| 7,793,419 B2 * | 9/2010 | Maxim | 30/392 |
| 8,117,757 B2 * | 2/2012 | Kuo | 30/392 |
| 2002/0008445 A1 | 1/2002 | Pelrine et al. | |

(Continued)

FOREIGN PATENT DOCUMENTS

DE    3408847 A1    11/1985
DE    3543764 A1    6/1986

(Continued)

*Primary Examiner* — Jason Daniel Prone
(74) *Attorney, Agent, or Firm* — Maginot, Moore & Beck

(57) ABSTRACT

An electric hand power tool with oscillating working movement, particularly translation movement, is made particularly compact and with low volume by an elastomeric module. The elastomeric module expands and/or contracts when electric voltage is applied, and is used as a drive for the hand power tool. The elastomeric module is coupled mechanically to a tool and is coupled electrically to a voltage source.

20 Claims, 3 Drawing Sheets

(56) References Cited

U.S. PATENT DOCUMENTS

| | | |
|---|---|---|
| 2002/0017026 A1* | 2/2002 | Kakiuchi et al. .............. 30/392 |
| 2002/0095798 A1* | 7/2002 | Ellis et al. .................... 30/392 |
| 2003/0177646 A1* | 9/2003 | Watanabe ..................... 30/392 |
| 2005/0127788 A1 | 6/2005 | Hess |
| 2006/0174495 A1* | 8/2006 | Jumior .......................... 30/392 |
| 2007/0094877 A1* | 5/2007 | Bohne et al. .................. 30/392 |
| 2008/0209742 A1* | 9/2008 | Kretschmar et al. .......... 30/392 |
| 2008/0244916 A1* | 10/2008 | Felder ........................... 30/392 |
| 2009/0044416 A1* | 2/2009 | Zaiser et al. .................. 30/392 |
| 2009/0119935 A1* | 5/2009 | Gatten et al. ................. 30/392 |
| 2009/0197514 A1* | 8/2009 | Peisert .......................... 30/392 |

FOREIGN PATENT DOCUMENTS

| | | |
|---|---|---|
| DE | 8706162 U1 | 7/1987 |
| DE | 3714237 A1 | 11/1988 |
| DE | 102008041682 A1 * | 3/2010 |
| EP | 2328706 A1 * | 6/2011 |
| GB | 891832 A | 3/1962 |
| JP | 7-60581 A | 3/1995 |
| JP | 2007-117447 A | 5/2007 |
| JP | 2012500729 A * | 1/2012 |
| JP | 5154743 B2 | 2/2013 |
| WO | 2004020134 A1 | 3/2004 |
| WO | WO 2010023007 A1 * | 3/2010 |

* cited by examiner

ELECTRIC HAND POWER TOOL

CROSS-REFERENCE TO RELATED APPLICATION

This application is a 35 USC 371 application of PCT/EP 2009/058542 filed on Jul. 7, 2009.

BACKGROUND OF THE INVENTION

1. Field of the Invention

The present invention is based on a hand power tool.

2. Description of the Prior Art

Very compact, small cordless hand power tools in the low to medium power class are known with a rotary working motion for drilling, screwdriving, milling, polishing, and sawing.

Less compact hand power tools of the medium power class have until now been designed with a translational working motion. They have rotating electric motors, which have the requisite power for the applications relevant to electric tools, such as sawing, sanding or scraping. Because of the gear that converts the rotary motion of the electric motor into a translational motion, the structural volume of these power tools is markedly greater than for hand power tools with a rotary working motion that make do without such a gear. Moreover, the hand power tools with a translational working motion lack the characteristic of a variably adjustable working stroke, which until now could be achieved only in a very complex way.

ADVANTAGES AND SUMMARY OF THE INVENTION

The advantage of the invention is that a hand power tool is provided with a drive which, for the working conditions practically required in hand power tools, makes a direct conversion of electrical energy into a translational motion possible, with the requisite adjustable stroke, frequency, power, and efficiency.

Because the drive employs dielectric elastomers, also called electroactive polymers, which expand and contract adjustably by up to 30% when voltage is applied, a reciprocating drive is feasible that works without the aforementioned gear that converts the rotary motion of an electric motor into a translational motion.

Because the drive is made from elastomers, not only its working frequency but its stroke and thus the deflections of the tool of the particular hand power tool are variously adjustable and programmable.

Because the drive in the form of a tube of dielectric elastomers is combined with a spring and virtually forms an "artificial muscle", the drive forms a compact power takeoff module, and directly generates a reciprocating motion of the tool.

Because the drive in variants is provided with a variable thickness and winding of the elastomer, the stroke and the lifting forces can be adapted to the particular power required for the electric tool.

Because the drive is disposed multiple times in the opposite direction, a power takeoff rod can be driven electrically back and forth.

Because the drive has either a central power takeoff rod or a parallel-supported power takeoff rod that can be coupled with the drive, a small-volume special version, or an economical, larger-volume standard drive module, can be employed as needed.

Because the drive is used in conjunction with lithium-ion rechargeable batteries, the result is a very compact electric tool with reciprocating working motion for sawing, sanding, filing, scraping, and so forth.

Because the lifting rod of the saber saw is supported in pendulum fashion and is coupleable to a pendulum lifting mechanism, which imparts a pendulum motion, and in particular a pendulum motion moving forward in the working stroke, to the lifting rod during its reciprocating motion, the cutting power is better.

Because the lifting rod is supported in pendulum fashion and instead of being coupled to a pendulum lifting mechanism can be coupled to a further elastomer module, which drives the lifting rod in pendulum fashion during the reciprocating motion of the lifting rod, the pendulum stroke is reliably and variably controllable and programmable.

Because the lifting rod, on its upper end, has an oblong slot through which a pendulum shaft extends, about which the lifting rod is guided, in a manner capable of swinging like a pendulum in the advancement direction, the pendulum motion can be attained precisely and securely, attained at little effort or expense.

Because at least one pendulum roll is disposed for bracing on the sawblade spine for imparting the pendulum stroke, in particular in synchronism with the lifting motion of the lifting rod, the sawblade is guided especially securely in the workpiece engagement during the active pendulum stroke.

Because the pendulum roll is driven to move in pendulum fashion via its own drive, in particular via an elastomer module, the pendulum stroke can be regulated variably, independently of the sawing stroke of the lifting rod and adapted to that stroke.

BRIEF DESCRIPTION OF THE DRAWINGS

The invention is described in further detail below in terms of an exemplary embodiment, in conjunction with the associated drawings, in which.

DESCRIPTION OF THE PREFERRED EMBODIMENTS

Figure 1:
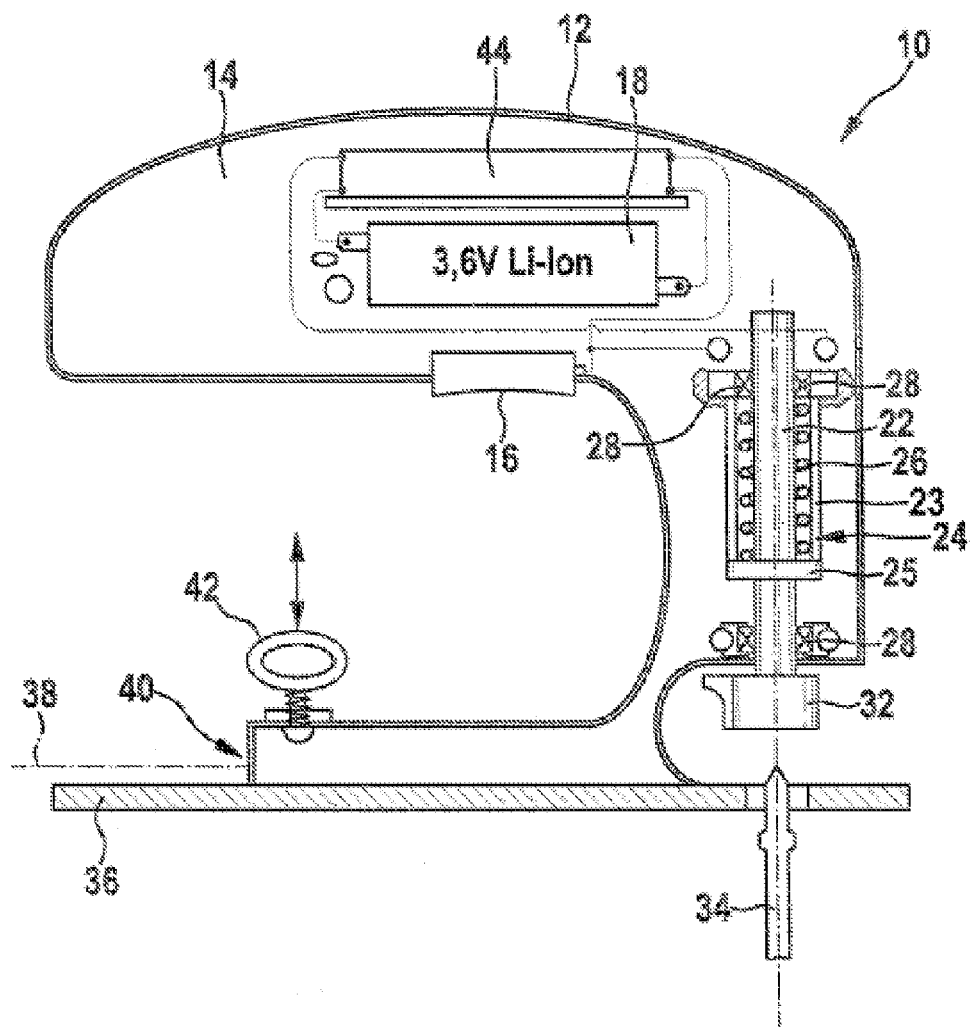
FIG. 1 shows a longitudinal section through a saber saw of the invention without pendulum motion.

The cordless saber saw 10 shown in longitudinal section in FIG. 1 has a housing 12 with a pistol grip 14, which toward the bottom has an outward-protruding switch button 16 for switching a drive module 24 of the saber saw 10 on and off, and a rechargeable battery 18 on the inside, in particular a lithium-ion battery, for operating the drive module 24.

The housing 12 is supported, positionably pivotably by at least 45° to either side for mitering cuts on a base plate 36 with a pivot joint 40 about a pivot axis 38, which determines the advancement direction, for mitering cuts. The various pivoting positions of the housing 12 relative to the base plate 36 are releasably lockable by means of locking means 42 not further described.

The drive module 24 comprises a tubular elastomer module 23, which contains a tube of dielectric elastomer. This module, together with a compression spring 26, concentrically surrounds a lifting rod 22 and jointly with the spring 26 is braced axially on a piston 25, which is coupled mechanically to the lifting rod 22 and in particular surrounds the lifting rod concentrically and nondisplaceably.

The elastomer module 23 is coupled electrically with the battery 18, and an electronic unit 44, which converts the voltage of the battery 18 to a high voltage and assigns it to the elastomer module 23, is connected between the battery 18 and the elastomer module 23. This electronic unit 44, for instance after the actuation of the switch button 16, contracts or expands with an adjustable stroke under high voltage—or after the high voltage is shut off and/or after short-circuiting of the elastomer, the elastomer module 23 expands counter to the force of the spring 26 with an adjustable stroke, or contracts again—depending on the type of elastomer—and in the process carries the piston 25 and thus the lifting rod 22 along with it with a variably adjustable stroke with rectilinear displacement.

When high voltage controlled via the electronic unit 44 or the like is applied, the elastomer module 23 works back and forth and jointly with the compression spring 26 of the lifting rod 22 imparts an oscillating lifting motion, which is suitable for reciprocating sawing work, to the saber saw 10.

The lifting rod 22 is supported, displaceable up and down, in one upper and one lower lifting rod bearing 28 each. On its lower end, the lifting rod 22 has a retaining device 32, known per se, for retaining a saber saw blade 34, known per se, which can be used for sawing given a suitable lifting motion of the lifting rod 22.

The elastomer module 23 is electrically connected via the switch button 16, or short-circuitable by means of the switch button 16, to the battery 18 and the following electronic unit 44. The current supply can be made by means of arbitrary types of batteries, or for instance by means of a power cord.

The drive of the saber saw can also be represented with two contrarily disposed elastomer modules, which are connected in alternation to a voltage and thus realize the oscillating motion of the lifting rod without an intervening spring.

The compression spring 26, depending on the type of elastomer, can also be designed as a tension spring.

Figure 2:
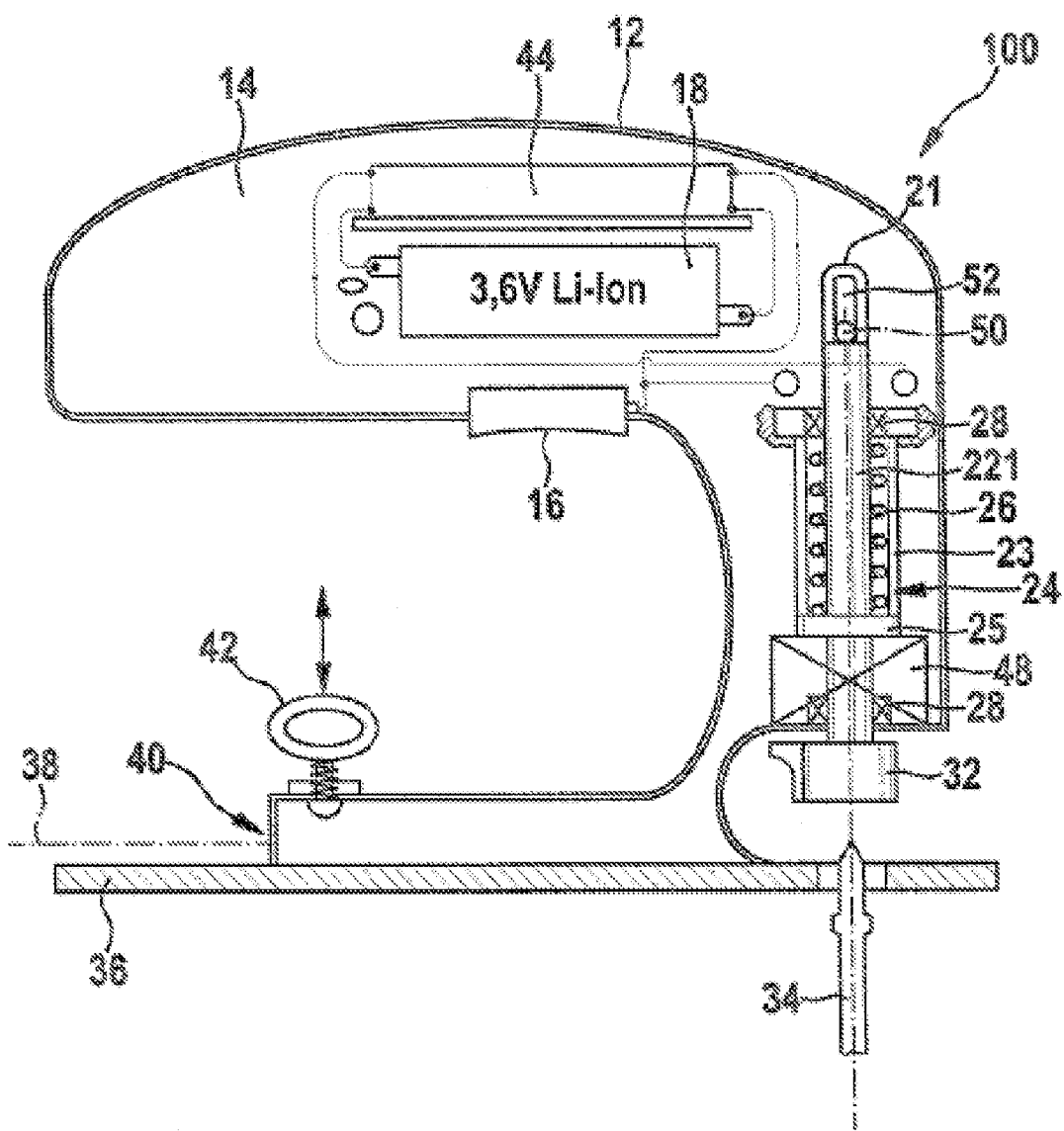
FIG. 2 shows a saber saw of FIG. 1 with mechanical pendulum motion.

The saber saw 100 shown in FIG. 2 essentially matches the saber saw 10 of FIG. 1 and differs from it only in terms of a pendulum lifting mechanism 46 associated with the lifting rod 221. For that purpose, the lifting rod 221 is supported pivotably by its upper, lengthened end 21, about a pendulum shaft 50 which is structurally connected to the housing and extends at the top transversely to the pivot axis 38. For that purpose, the pendulum shaft 50 extends through an oblong slot 52 in the upper end 21 of the lifting rod 221, so that the lifting rod, in its up-and-down motion is movable in pendulum fashion additionally in a plane defined by the advancement direction. To that end, the lifting rod bearings 28, jointly with the lifting rod 221 and the drive module 24, are supported drivably in pendulum fashion in the housing 12 by means of the pendulum lifting mechanism 46, represented only by a symbol, so that the lifting rod 221 in the upward stroke moves in pendulum fashion in the advancement direction.

Figure 3:
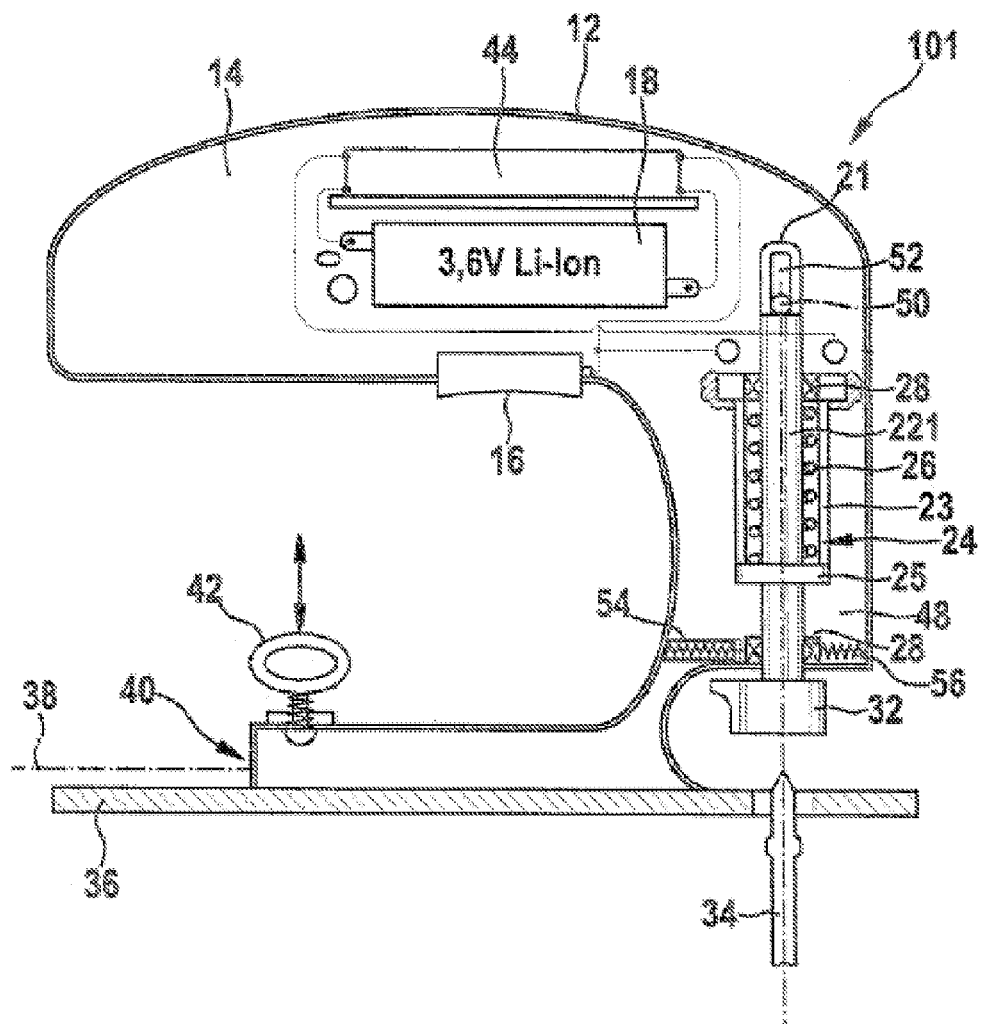
FIG. 3 shows a saber saw of FIG. 1 with electrical pendulum motion.

The saber saw 101 shown in FIG. 3 differs from the saber saw 10 of FIG. 1 only in terms of the pendulum drive of the lifting rod 221. Instead of a pendulum lifting mechanism, there is a second elastomer module, in the form of a pendulum module 54. It imparts a transverse motion with an adjustable stroke in the advancement direction counter to the pendulum spring 56 to the lower lifting rod bearing 28 in the upward stroke of the lifting rod 221, so that in the downward stroke the reverse stroke is imparted to the lifting rod 221 by the pendulum spring 56. To that end, the lifting rod 221 is supported pivotably by its upper, lengthened end 21 about the pendulum shaft 50, structurally connected to the housing and extending at the top transversely to the pivot axis 38, and for that purpose this pendulum shaft reaches through the oblong slot 52 in the upper end 21 of the lifting rod 221.

Ideally, the saber saws 10, 100 and 101 have an adjustable stroke of approximately 1 to 10 mm, and the battery 18 is approximately 80 mm long, and the lifting rod with the integrated drive module 24 is approximately 100 mm long. As a result, with high power potential, the result is extremely compact dimensions of the saber saws.

Preferably, the saber saws 100 and 101 have a pendulum roll for bracing on the sawblade spine for transmitting an especially efficient pendulum stroke directly to the sawblade.

In further variants according to the invention of a saber saw, a conventionally driven saber saw, instead of a pendulum mechanism, has an elastomer drive module, or a saber saw with an elastomer drive module for driving the lifting rod has a piezoelectric drive for the pendulum motion of the lifting rod.

To generate reciprocating rotary motions of a power take-off shaft for sanding and sawing, suitably disposed elastomer modules with the following lifting rod gears can also be employed to replace a conventional motor with an eccentric gear.

The use of the elastomer drive modules is also advantageous for driving a scraper or for generating the reciprocating motion of a rotary hammer power takeoff shaft for chiseling.

In a further, advantageous embodiment, a tool has high deflection frequencies at low amplitudes, and low deflection frequencies at high amplitudes—depending on the magnitude of the voltage applied and on the resultant stiffness of the elastomer. This kind of design allows the use of manifold working tools, such as sawblades, sanding attachments, chisels, and scraper inserts.

The foregoing relates to the preferred exemplary embodiments of the invention, it being understood that other variants and embodiments thereof are possible within the spirit and scope of the invention, the latter being defined by the appended claims.

The invention claimed is:

1. An electric hand power-tool comprising:
   a lifting rod configured to support a working tool;
   a voltage source;
   a piston fixedly connected to the lifting rod;
   a spring wrapped around a portion of the lifting rod and braced at one end on the piston;
   a tubular elastomer module positioned at least partially surrounding the lifting rod and braced on the piston rod concentrically with the spring,
   wherein the tubular elastomer module is configured to perform at least one of an expansion and a contraction in response to electrical voltage is being applied to the tubular elastomer module by the voltage source, and
   wherein the at least one of the expansion and the contraction of the tubular elastomer module moves the lifting rod and the working tool in a first direction from an initial position, and the spring is configured to restore the lifting rod and the working tool to the initial position after the at least one of the expansion and the contraction to produce an oscillating translational motion of the working tool.

2. The electric hand power-tool as defined by claim 1, wherein the spring includes one of a compression spring and a tension spring.

3. The electric hand power-tool as defined by claim 2, wherein the electric hand power-tool is designed as a saber saw.

4. The electric hand power-tool as defined by claim 3, wherein the lifting rod of the saber saw is supported in pendulum fashion and is coupled to a pendulum lifting mechanism, which imparts to the lifting rod, during the oscillating translational motion, a pendulum motion moving in a forward direction, which is substantially orthogonal to the first direction.

5. The electric hand power-tool as defined by claim 4, wherein:
the working tool includes a sawblade having a sawblade spine, and
at least one pendulum roll is disposed for bracing on the sawblade spine to impart the pendulum motion in synchronism with the oscillating translational motion of the lifting rod.

6. The electric hand power-tool as defined by claim 3, wherein the lifting rod is supported in pendulum fashion and is coupled to a further elastomer module, which drives the lifting rod in pendulum fashion during the oscillating translational motion.

7. The electric hand power-tool as defined by claim 1, wherein the tubular elastomer module, for moving the tool in the oscillating translational motion, is coupled to a second contrary-motion elastomer module.

8. The electric hand power-tool as defined by claim 7, wherein the electric hand power-tool is designed as a saber saw.

9. The electric hand power-tool as defined by claim 8, wherein the lifting rod of the saber saw is supported in pendulum fashion and is coupled to a pendulum lifting mechanism, which imparts to the lifting rod, during the oscillating translational motion, a pendulum motion moving in a forward direction, which is substantially orthogonal to the first direction.

10. The electric hand power-tool as defined by claim 9, wherein the lifting rod, on an upper end, has an oblong slot through which a pendulum shaft extends, about which the lifting rod swings like a pendulum in an advancement direction.

11. The electric hand power-tool as defined by claim 9, wherein:
the working tool includes a sawblade having a sawblade spine, and
at least one pendulum roll is disposed for bracing on the sawblade spine to impart the pendulum motion in synchronism with the oscillating translational motion of the lifting rod.

12. The electric hand power-tool as defined by claim 11, wherein the pendulum roll is driven to move in pendulum fashion via a second elastomer module.

13. The electric hand power-tool as defined by claim 8, wherein the lifting rod is supported in pendulum fashion and is coupled to a further elastomer module, which drives the lifting rod in pendulum fashion during the oscillating translational motion.

14. The electric hand power-tool as defined by claim 1, wherein the electric hand power-tool is designed as a saber saw.

15. The electric hand power-tool as defined by claim 14, wherein the lifting rod of the saber saw is supported in pendulum fashion and is coupled to a pendulum lifting mechanism, which imparts to the lifting rod, during the oscillating translational motion, a pendulum motion moving in a forward direction, which is substantially orthogonal to the first direction.

16. The electric hand power-tool as defined by claim 15, wherein the lifting rod, on an upper end, has an oblong slot through which a pendulum shaft extends, about which the lifting rod swings like a pendulum in an advancement direction.

17. The electric hand power-tool as defined by claim 15, wherein:
the working tool includes a sawblade having a sawblade spine, and
at least one pendulum roll is disposed for bracing on the sawblade spine to impart the pendulum motion in synchronism with the oscillating translational motion of the lifting rod.

18. The electric hand power-tool as defined by claim 17, wherein the pendulum roll is driven to move in pendulum fashion via a second elastomer module.

19. The electric hand power-tool as defined by claim 14, wherein the lifting rod is supported in pendulum fashion and is coupled to a further elastomer module, which drives the lifting rod in pendulum fashion during the oscillating translational motion.

20. The electric hand power-tool as defined by claim 1, further comprising:
an electronic unit configured to adjust the electrical voltage applied to the elastomer to adjust an amplitude and a working frequency of the lifting rod,
wherein the electronic unit is further configured so that the amplitude and the working frequency are programmable.

\* \* \* \* \*

UNITED STATES PATENT AND TRADEMARK OFFICE
CERTIFICATE OF CORRECTION

PATENT NO. : 8,732,963 B2  
APPLICATION NO. : 12/737914  
DATED : May 27, 2014  
INVENTOR(S) : Martin Sinner-Hettenbach et al.

Page 1 of 1

It is certified that error appears in the above-identified patent and that said Letters Patent is hereby corrected as shown below:

In the Claims

Column 4, lines 50-53, the 10th through 14th line of claim 1, should read as follows:

wherein the tubular elastomer module is configured to
      perform at least one of an expansion and a contraction in
      response to electrical voltage being applied to the
      tubular elastomer module by the voltage source, and Signed and Sealed this  
Eleventh Day of November, 2014

Michelle K. Lee  
*Deputy Director of the United States Patent and Trademark Office*